United States Patent
Gaugler

(10) Patent No.: US 9,799,858 B2
(45) Date of Patent: Oct. 24, 2017

(54) BUTTON CELL HAVING WINDING ELECTRODE AND METHOD FOR THE PRODUCTION THEREOF

(75) Inventor: Winfried Gaugler, Ellwangen (DE)

(73) Assignee: VARTA Microbattery GmbH (DE)

( * ) Notice: Subject to any disclaimer, the term of this patent is extended or adjusted under 35 U.S.C. 154(b) by 0 days.

(21) Appl. No.: 13/378,117

(22) PCT Filed: Jun. 18, 2010

(86) PCT No.: PCT/EP2010/058637
§ 371 (c)(1),
(2), (4) Date: Dec. 14, 2011

(87) PCT Pub. No.: WO2010/146154
PCT Pub. Date: Dec. 23, 2010

(65) Prior Publication Data
US 2012/0100406 A1    Apr. 26, 2012

(30) Foreign Application Priority Data

Jun. 18, 2009 (DE) .......................... 10 2009 030 359
Dec. 31, 2009 (DE) .......................... 10 2009 060 800

(51) Int. Cl.
*H01M 4/00* (2006.01)
*H01M 2/02* (2006.01)
(Continued)

(52) U.S. Cl.
CPC ....... *H01M 2/0222* (2013.01); *H01M 2/0413* (2013.01); *H01M 2/0439* (2013.01);
(Continued)

(58) Field of Classification Search
CPC ........... H01M 2/0439; H01M 10/0587; H01M 10/0525; H01M 2/0413; H01M 2/0222;
(Continued)

(56) References Cited

U.S. PATENT DOCUMENTS 3,827,916 A    8/1974   Fagan, Jr.
3,960,599 A    6/1976   Reynier et al.
(Continued)

FOREIGN PATENT DOCUMENTS

CN    201440429    4/2010
DE    1 471 758    5/1969
(Continued)

OTHER PUBLICATIONS

English language machine translation of JP 2008-262825.*
(Continued)

*Primary Examiner* — Jonathan Jelsma
*Assistant Examiner* — Omar Kekia
(74) *Attorney, Agent, or Firm* — DLA Piper LLP (US)

(57) ABSTRACT

A button cell includes a housing consisting of two metal housing halves, an electrode separator assembly in the form of a preferably spiral-shaped winding inside the housing, and metal conductors which electrically connect the electrodes of the assembly to the housing halves, wherein at least one of the conductors is connected to the respective housing half by welding.

9 Claims, 5 Drawing Sheets

(51) Int. Cl.
| | |
|---|---|
| *H01M 2/04* | (2006.01) |
| *H01M 2/06* | (2006.01) |
| *H01M 2/26* | (2006.01) |
| *H01M 10/04* | (2006.01) |
| *H01M 10/0587* | (2010.01) |
| *H01M 10/0525* | (2010.01) |

(52) U.S. Cl.
CPC ............ *H01M 2/06* (2013.01); *H01M 2/263* (2013.01); *H01M 10/0427* (2013.01); *H01M 10/0436* (2013.01); *H01M 10/0587* (2013.01); *H01M 2/0227* (2013.01); *H01M 10/0525* (2013.01); *Y10T 29/4911* (2015.01)

(58) Field of Classification Search
CPC .... H01M 10/0436; H01M 2/06; H01M 2/263; H01M 2/0465; H01M 2/0227; Y10T 29/4911
USPC ............. 429/1–11, 47–255; 29/623.1–623.5; 219/121.64
See application file for complete search history.

(56) References Cited

U.S. PATENT DOCUMENTS

| | | | |
|---|---|---|---|
| 4,091,181 | A | 5/1978 | Merritt, Jr. |
| 4,220,695 | A | 9/1980 | Ishida et al. |
| 4,224,387 | A | 9/1980 | Nakayama |
| 4,487,819 | A | 12/1984 | Koga |
| 4,539,271 | A | 9/1985 | Crabtree |
| 4,927,719 | A | 5/1990 | Ashihara et al. |
| 5,273,842 | A | 12/1993 | Yamahira et al. |
| 5,356,736 | A | 10/1994 | Kita et al. |
| 5,567,538 | A | 10/1996 | Oltman et al. |
| 5,603,737 | A | 2/1997 | Marincic et al. |
| 5,631,104 | A | 5/1997 | Zhong et al. |
| 5,698,340 | A | 12/1997 | Xue et al. |
| 5,792,574 | A | 8/1998 | Mitate et al. |
| 6,066,184 | A | 5/2000 | Brenner |
| 6,143,440 | A | 11/2000 | Votz et al. |
| 6,245,452 | B1 | 6/2001 | Oltman |
| 6,265,100 | B1* | 7/2001 | Saaski et al. ................. 429/163 |
| 6,277,522 | B1 | 8/2001 | Omaru et al. |
| 6,443,999 | B1 | 9/2002 | Cantave et al. |
| 7,488,553 | B2 | 2/2009 | Tsukamoto et al. |
| 7,566,515 | B2 | 7/2009 | Suzuki et al. |
| 2001/0009737 | A1* | 7/2001 | Lane ............................ 429/174 |
| 2002/0034680 | A1 | 3/2002 | Inoue et al. |
| 2002/0192559 | A1 | 12/2002 | Yoshimura et al. |
| 2003/0013007 | A1 | 1/2003 | Kaun |
| 2004/0029004 | A1 | 2/2004 | Miyaki |
| 2004/0048160 | A1 | 3/2004 | Omaru |
| 2004/0110061 | A1 | 6/2004 | Haug et al. |
| 2005/0058904 | A1 | 3/2005 | Kano et al. |
| 2005/0181276 | A1 | 8/2005 | Miyaki |
| 2005/0271938 | A1* | 12/2005 | Suzuki et al. ................. 429/185 |
| 2008/0003500 | A1* | 1/2008 | Issaev et al. ................. 429/200 |
| 2008/0318126 | A1 | 12/2008 | Ishii |
| 2009/0325062 | A1 | 12/2009 | Brenner et al. |
| 2010/0227217 | A1 | 9/2010 | Fujikawa et al. |
| 2011/0091753 | A1 | 4/2011 | Wang et al. |
| 2011/0200871 | A1 | 8/2011 | Pytlik et al. |
| 2012/0015224 | A1 | 1/2012 | Pytlik et al. |
| 2012/0028110 | A1 | 2/2012 | Brenner |
| 2012/0100406 | A1 | 4/2012 | Gaugler |
| 2013/0130066 | A1 | 5/2013 | Pytlik et al. |
| 2013/0216881 | A1 | 8/2013 | Gaugler et al. |

FOREIGN PATENT DOCUMENTS

| | | |
|---|---|---|
| DE | 31 13 309 A1 | 10/1982 |
| DE | 36 38 793 A1 | 5/1988 |
| DE | 196 47 593 A1 | 5/1998 |
| DE | 697 00 312 | 2/2000 |
| DE | 198 57 638 | 6/2000 |
| DE | 10 2009 008 859 A1 | 8/2010 |
| DE | 10 2009 017 514 A1 | 10/2010 |
| EP | 0 202 857 | 7/1991 |
| EP | 1 318 561 A1 | 6/2003 |
| EP | 1 339 115 A1 | 8/2003 |
| EP | 1 372 209 A1 | 12/2003 |
| EP | 1 808 916 A1 | 7/2007 |
| EP | 1 968 134 | 9/2008 |
| GB | 1088271 | 10/1967 |
| GB | 2 110 464 | 6/1983 |
| JP | 1-307176 | 12/1989 |
| JP | H05-121056 | 5/1993 |
| JP | 7-153488 | 6/1995 |
| JP | 8-293299 | 11/1996 |
| JP | 11-345626 A | 12/1999 |
| JP | 11-354150 A | 12/1999 |
| JP | 2000-77040 | 3/2000 |
| JP | 2002-352789 | 12/2002 |
| JP | 2003-31266 | 1/2003 |
| JP | 2004-158318 | 6/2004 |
| JP | 3902330 B2 | 4/2007 |
| JP | 2007-200683 | 8/2007 |
| JP | 2007-294111 A | 11/2007 |
| JP | 2008-251192 | 10/2008 |
| JP | 2008-262825 * | 10/2008 ............ H01M 10/36 |
| JP | 2008-262825 A | 10/2008 |
| JP | 2008-262826 | 10/2008 |
| WO | 2010/089152 A1 | 8/2010 |

OTHER PUBLICATIONS

US Official Action dated Mar. 27, 2014 from related U.S. Appl. No. 13/146,669.

US Official Action dated Sep. 2, 2014 from related U.S. Appl. No. 13/146,669.

Linden, D. et al., "Handbook of Batteries," 2002, Third Edition, The McGraw-Hill Companies, Inc., Sections 11.4, 11.4.1, 14.1, 14.5.2, 14.8 and 14.8.2, and Figs. 11.2, 11.5, 14.38, 34.13, 35.30 and 35.32.

* cited by examiner

180# BUTTON CELL HAVING WINDING ELECTRODE AND METHOD FOR THE PRODUCTION THEREOF

RELATED APPLICATIONS

This is a §371 of International Application No. PCT/EP2010/058637, with an international filing date of Jun. 18, 2010 (WO 2010/146154 A2, published Dec. 23, 2010), which is based on German Patent Application Nos. 10 2009 030 359.6, filed Jun. 18, 2009, and 10 2009 060800.1, filed Dec. 31, 2009, the subject matter of which is incorporated by reference.

TECHNICAL FIELD

This disclosure relates to button cells having a housing consisting of two metal housing halves, which contains a wound electrode separator assembly, and to a method for its production.

BACKGROUND

Button cells conventionally comprise a housing consisting of two housing halves: a cell cup and a cell top. These may, for example, be produced as stamped parts from nickel-plated deep-drawn sheet metal. Usually, the cell cup is positively poled and the housing top negatively poled. The housing may contain a very wide variety of electrochemical systems, for example, zinc/$MnO_2$, primary and secondary lithium systems, or secondary systems such as nickel/cadmium or nickel/metal hydride.

The liquid-tight closure of button cells is conventionally carried out by crimping the edge of the cell cup over the edge of the cell top, in combination with a plastic ring which is arranged between the cell cup and the cell top and is used simultaneously as a sealing element and for electrical insulation of the cell cup and the cell top. Such button cells are described, for example, in DE 31 13 309.

As an alternative, however, it is also possible to manufacture button cells in which the cell cup and the cell top are held together in the axial direction exclusively by a force-fit connection, and which correspondingly do not have a crimped cup edge. Such button cells and a method for their production are described in unpublished German patent application 10 2009 017 514.8. Regardless of the various advantages which such button cells without crimping may present, they nevertheless cannot withstand such high stresses in the axial direction as comparable button cells with a crimped cup edge, especially as regards axial mechanical loads which originate from inside the button cell. For example, the electrodes of rechargeable lithium ion systems are constantly subjected to volume changes during charging and discharging processes. In button cells without crimping, the axial forces occurring in this case can naturally cause leaks more easily compared with button cells with crimping.

A solution to this problem may be found in unpublished German patent applications 10 2009 030 359.6 and 10 2009 008 859.8. Inter alia, references may be found therein to button cells comprising a housing having a plane bottom region and a plane top region parallel thereto, an assembly consisting of flat electrode layers and separator layers in the form of a preferably spiral-shaped electrode winding being arranged in the housing in such a way that the end sides of the winding face in the direction of the plane bottom region and the plane top region. The electrode layers of the winding are thus oriented essentially orthogonally to the plane bottom and top regions of the housing. As a result of this, radial forces such as occur during the aforementioned charging and discharging processes of lithium ion systems can in principle be absorbed better than in the case of conventional lithium ion button cells, in which electrode layers are arranged stacked in parallel alignment with the plane bottom and top regions.

Windings consisting of flat electrode layers and separator layers can be produced quite straightforwardly using known methods (see, for example, DE 36 38 793) by the electrodes being applied, in particular laminated, particularly in the form of strips, flat onto a separator provided as an endless band. The assembly consisting of the electrodes and separators is generally wound on a so-called "winding mandrel." After the winding has been removed from the winding mandrel, an axial cavity is left at the center of the winding, the effect of which is that the winding may possibly expand into this cavity. This, however, can sometimes lead to problems in the electrical contact of the electrodes with the metal housing halves.

It could therefore be helpful to provide a button cell in which the aforementioned problems do not occur, or only occur to a greatly reduced extent.

SUMMARY

I provide a button cell including two metal housing halves separated from one another by an electrically insulating seal forming a housing having a plane bottom region and a plane top region parallel thereto, an electrode separator assembly including at least one positive electrode and at least one negative electrode inside the housing, the assembly provided in the form of a winding, end sides of which face in a direction of the plane bottom region and the plane top region, and metal conductors electrically connected to the at least one positive electrode and the at least one negative electrode, respectively, to one of the housing halves, wherein at least one of the conductors is connected to the respective housing half by welding wherein weld beads and/or weld spots pass through the housing.

I also provide a method for producing button cells including (a) providing a first and a second metal housing half, (b) placing an electrode separator assembly including a positive electrode and a negative electrode in one of the housing halves, wherein a metal conductor bonded to at least one of the electrodes, (c) assembling the two housing halves, and, subsequently, (d) laser welding at least one of the conductors to the inner side of one of the metal housing halves.

DETAILED DESCRIPTION

Figure 1A:
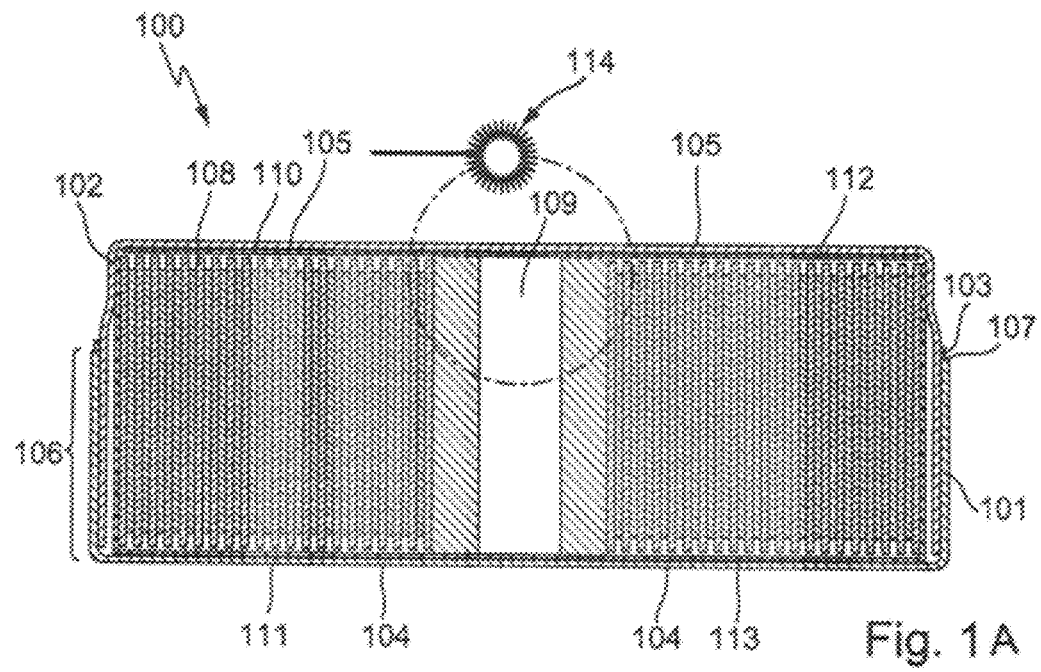
FIGS. 1A and 1B schematically show a cross section of a preferred example of a button cell 100.

My button cell always comprises two metal housing halves separated from one another by an electrically insulating seal and forming a housing having a plane bottom region and a plane top region parallel thereto. As mentioned in the introduction, the two housing halves are generally a so-called "housing cup" and a "housing top." In particular, nickel-plated steel or sheet metal are preferred as the material for the housing halves. Trimetals, in particular, are furthermore suitable as the metallic material, for example, ones comprising the sequence nickel, steel (or stainless steel) and copper (in which case the nickel layer preferably forms the outer side of the button cell housing and the copper layer preferably forms the inner side).

As the seal, it is, for example, possible to use an injection-molded seal or a film seal. The latter are described, for example, in DE 196 47 593.

At least one positive electrode and at least one negative electrode are arranged inside the housing, specifically each in the form of flat electrode layers. The electrodes are preferably connected to one another by at least one flat separator. The electrodes are preferably laminated or adhesively bonded onto this separator. The electrodes and the separator generally each have a thickness only in the μm range. A porous plastic film is generally used as the separator.

This assembly is provided in the form of a winding, particularly in the form of a spiral-shaped winding, in the housing of a button cell, the winding being arranged such that its end sides face in the direction of the plane bottom region and the plane top region of the housing. Full reference is hereby made to the description of such windings, and button cells comprising such windings, in unpublished German patent applications DE 10 2009 030 359.6 and DE 10 2009 008 859.8 already mentioned above. All the preferred forms described in those applications are also intended to apply for the button cell described here and the electrode winding described here.

Besides the housing halves and the electrode separator assembly, my button cell always also comprises metal conductors which electrically connect the at least one positive electrode and/or the at least one negative electrode respectively to one of the housing halves. The conductor or conductors connected to the at least one positive electrode preferably consist of aluminum. The conductors connected to the at least one negative electrode preferably consist of nickel or copper.

On the electrode side, the conductors are preferably connected to current collectors. The latter are generally metal foils or meshes conventionally coated on both sides with active electrode material. These current collectors preferably consist of aluminum on the side of the positive electrode, and preferably nickel or copper on the side of the negative electrode. The foils or meshes have, in particular, thicknesses of between 1 μm and 100 μm. The connecting of the conductors to the current collectors is preferably carried out by welding.

Particularly in respect of preferred forms of the electrode separator assembly arranged in my button cell, reference is made to DE 10 2009 030 359.6 and DE 10 2009 008 859.8. These disclose in particular preferred layer sequences and layer thicknesses for electrodes and separators, for example, an assembly comprising the layer sequence:
negative electrode/separator/positive electrode/separator
or
positive electrode/separator/negative electrode/separator.
Assemblies comprising the layer sequences:
negative electrode/separator/positive electrode/separator/ negative electrode
or
positive electrode/separator/negative electrode/separator/ positive electrode may also be preferred. In these, the assembly therefore comprises more than one positive electrode and/or more than one negative electrode.

Particularly preferably, at least one of the electrodes of a button cell is a lithium intercalation electrode. The button cell is preferably a lithium ion battery, in particular a secondary lithium ion battery.

My button cell is distinguished particularly in that at least one of the conductors is welded to the respective housing half, preferably both the conductor connected to the at least one positive electrode and the conductor connected to the at least one negative electrode.

As has already been mentioned in the introduction, particularly in the case of lithium ion button cells the electrodes are subject to volume changes during a charging-discharging cycle, as a result of which contact problems may arise between the conductors and the housing halves. Such contact problems no longer apply when the conductors are welded to the respective housing halves.

Particularly preferably, the conductor or conductors are welded onto the inner side of the housing in the plane bottom region or the plane top region, respectively, of the housing. For this purpose, according to conventional methods the welding process must be carried out before the housing is assembled, which is very difficult to achieve in terms of production technology. Welded connections have therefore been regarded as highly disadvantageous for bonding the conductors to the inner side of the housing halves. By virtue of my method as described in more detail below, however, a solution can be provided which also has great advantages in terms of production technology.

By the welding, the at least one positive electrode and/or the at least one negative electrode are thus connected by one or more conductors directly to the plane bottom region or to the plane top region of the housing of a button cell, the housing top generally being poled negatively and the housing cup positively.

The button cell is preferably a conventional button cell having a circular plane bottom region and a circular plane top region. In some cases, the button cell may nevertheless have an oval configuration. It is, however, important that the ratio of height to diameter is preferably always less than 1. Particularly preferably, it is between 0.1 and 0.9, in particular between 0.15 and 0.7. The height is in this case intended to mean the shortest distance between the plane bottom region and the plane top region parallel thereto. The diameter means the maximum distance between two points on the lateral region of the button cell.

Preferably, the conductors of a button cell are flat conductors, in particular metal foils, particularly preferably rectangular, strip- or band-shaped metal foils. The foils preferably have thicknesses of between 5 μm and 100 μm.

The conductors are preferably separate components bonded, in particular welded, to the electrodes, in particular to the current collectors in the electrodes. As an alternative, however, the conductors may also be uncoated sections of a current collector (sections which are free of active electrode material), in particular the uncoated ends of such a current collector. By bending these uncoated sections, in particular these uncoated ends, for example, through 90°, these ends can be connected to the bottom or top region of a button cell. There, the connecting is preferably carried out by welding.

Preferably, at least one subsection of the conductor or conductors bears flat on the inner side of the housing half or halves in the bottom and/or top region of the housing, in particular when the conductors are flat conductors such as foils. Such conductors may form a flat layer between the inner side of the housing halves and an end side of the electrode winding, and therefore a large-area electrical contact with the housing.

Since in principle both positive and negative electrodes may be exposed on the end sides of the electrode winding, however, it is necessary to avoid a short circuit between the electrodes. Particularly preferably, my button cell therefore comprises at least one separate insulating means which prevents direct electrical contact between the end sides of the winding and the conductors, in particular a subsection of the conductor or conductors which bears flat on the inner side of the housing halves. Such an insulating means may, for example, be a film, for example, a plastic adhesive film, by which the side of the conductor or conductors remote from the inner side of the button cell housing is covered.

The electrode winding of a button cell may be produced by known methods, for example, the method described in DE 36 38 793, according to which electrodes and separators are wound on a winding mandrel. After the winding has been removed from the winding mandrel, there may be an axial cavity at the center of the winding, preferably an essentially cylindrical axial cavity. In the housing of my button cell, such a cavity is delimited laterally by the winding and on the end sides by the bottom or top region of the housing, respectively, or at least by a subregion thereof. Particularly preferably, the at least one conductor is welded to one housing half or the housing halves in one of these subregions.

The axial cavity may optionally contain a winding core, which can prevent the winding from expanding uncontrolledly into the cavity.

The button cell is in particular a button cell without crimping, as is described in patent application 10 2009 017 514.8 already mentioned in the introduction. Accordingly, there is preferably an exclusively force-fit connection between the housing halves. The button cell thus does not have a crimped cup edge, as is always the case with button cells known from the prior art. The button cell is closed without crimping. The content of DE 10 2009 017 514.8 is also fully incorporated herein by reference. All the preferred forms described in that application is also intended to apply for the button cell described here and its housing.

As already mentioned above, welding of conductors to the inner side of button cell housings is very elaborate in terms of production technology. I overcome this problem with my method for producing button cells, which always comprises at least the following steps:
(a) providing a first and a second metal housing half (preferably a cell cup, and a cell top),
(b) placing an electrode separator assembly comprising a positive electrode and a negative electrode in one of the housing halves (preferably into the cell top), a metal conductor being bonded to at least one of the electrodes (preferably to all the electrodes),
(c) assembling the two housing halves (preferably by inserting the cell top into the cell cup), optionally with the provision of separate steps for sealing the housing (for example, fitting a seal) and
(d) welding at least one of the conductors to the inner side of one of the metal housing halves.

The components used in the method, such as the housing halves, the conductors and the electrode separator assembly, have already been described above. Reference is hereby made to the corresponding remarks.

The method is distinguished in particular in that step (d) is carried out after step (c). This means that the at least one conductor is welded to the inner side of the housing when the housing is closed. The welding must correspondingly be carried out from the outside through the housing wall of one or both housing halves.

Accordingly, I provide button cells which have weld beads and/or weld spots that pass through the housing, in particular starting from its outer side.

Particularly preferably, the conductor or conductors and the button cell housing are connected to one another by one or more spot-like and/or linear welded connections.

Welding the conductors and the housing is preferably carried out by a laser. Its operating parameters must be adapted as accurately as possible to the thickness of the housing. The power may, for example, be modulated by varying the pulse frequency. Lastly, the laser should merely ensure welding of the housing and conductors while other components such as the electrode winding should as far as possible not be damaged.

Suitable lasers are, for example, commercially available fiber lasers, i.e., solid-state lasers, in which the doped core of a glass fiber forms the active medium. The most common dopant for the laser-active fiber core is erbium. For high-power applications as in the present case, however, ytterbium and neodymium are more preferred.

Irrespective of the fact that such lasers can be adapted very finely to the respective housing thickness and conductor dimension, it is nevertheless possible that in certain cases the intensity of the laser will be selected to be too strong and the laser will penetrate through the housing wall and the conductor. For this reason, welding the conductors to the housing is particularly preferably carried out in the subregion of the bottom or top region, which delimits the axial cavity at the center of the winding on the end side. If a laser beam penetrates through the housing in this region, the winding cannot be damaged. Instead, the laser beam will be absorbed by the housing half lying opposite or by a winding core optionally arranged inside the cavity.

If possible, the conductors to be welded should bear as flatly as possible on the inner side of the housing. This may, for example, be ensured by fixing the conductors flat by an adhesive tape onto or at the end sides of an electrode winding, before the latter is inserted into the housing.

The aforementioned advantages, and further advantages thereof, are in particular also revealed by the description which now follows of the drawings. In this context, the individual features may be implemented separately or in combination with one another. The examples described merely serve for explanation and better understanding, and are in no way to be interpreted as restrictive.

Button cell 100 comprises two metal housing halves: a metal cup part 101 and a metal top part 102. With a seal 103 lying between them, the two parts are connected together in a leaktight fashion. Together, they form a housing having a plane bottom region 104 and a plane top region 105 parallel thereto. In the functional state, these two plane regions 104 and 105 form the poles of the button cell 100, from which current can be drawn by a load. The cell top 102 is inserted into the cell cup 101 so that the lateral surface regions of the cell top and the cell cup overlap, the internal radius of the cell cup 101 in the overlap region 106 being essentially constant in the direction of the rim 107. The edge of the cell 101 is thus not crimped. The button cell 100 is therefore an uncrimped button cell.

An assembly 108 of strip-shaped electrodes and strip-shaped separators is arranged inside the electrode. The assembly 108 is provided in the form of a spiral-shaped winding, the end sides of which face in the direction of the plane bottom region 104 and the plane top region 105 parallel thereto. The assembly is wound on the winding core 109 at the center of the button cell 100. The winding core is a hollow plastic cylinder, which partially fills an axial cavity at the center of the winding. The cavity itself is delimited laterally by the winding and upward and downward by corresponding circular sections of the plane cup and top regions of the button cell housing. Metal foils 110 and 111, which act as conductors and are connected to the electrodes, bear flat on these regions. These conductors are shielded from the end sides of the winding by the insulating elements 112 and 113. The latter are thin plastic films. The wall thickness of the housing in the region of the plane bottom or top region is generally between 30 µm and 400 µm. The thickness of the metal foils 110 and 111 acting as conductors generally lies between 5 µm and 100 µm.

Welding of the metal foils 110 and 111, acting as conductors, to the respective housing half, which is preferably done by the schematically represented laser 114, is preferably carried out in that subregion of the bottom region or of the top region of the button cell housing which delimits the axial cavity at the center of the winding on the end side. This creates a weld bead 115 which passes fully through the housing of the button cell 100 from the outside inward, and by means of which the internally lying metal foils 110 and 111 acting as conductors are firmly connected to the inner side of the housing. This can be seen clearly in the detail enlargement (FIG. 1B).

Figure 1B:
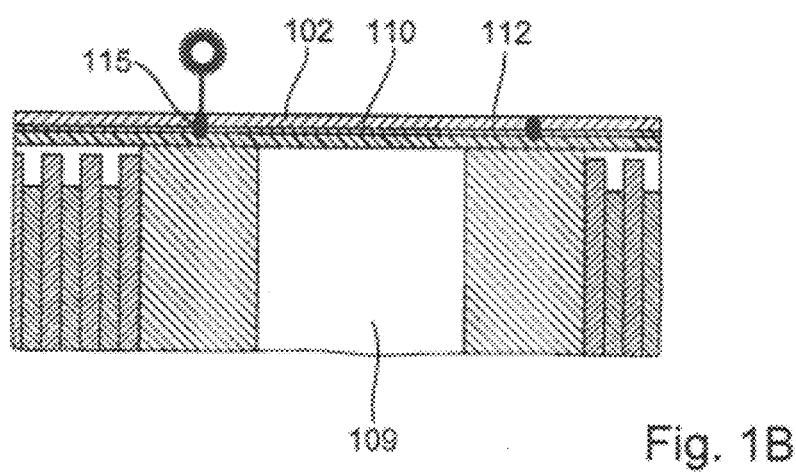
Figure 2A:
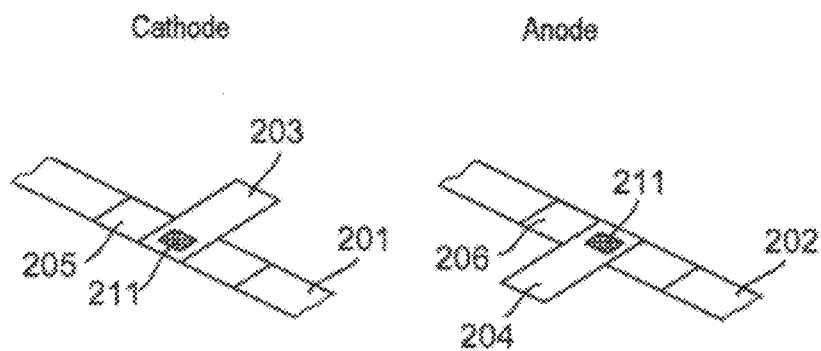
FIGS. 2A to 2C schematically show selected assembly steps of the button cell of FIG. 1.
Figure 2B:
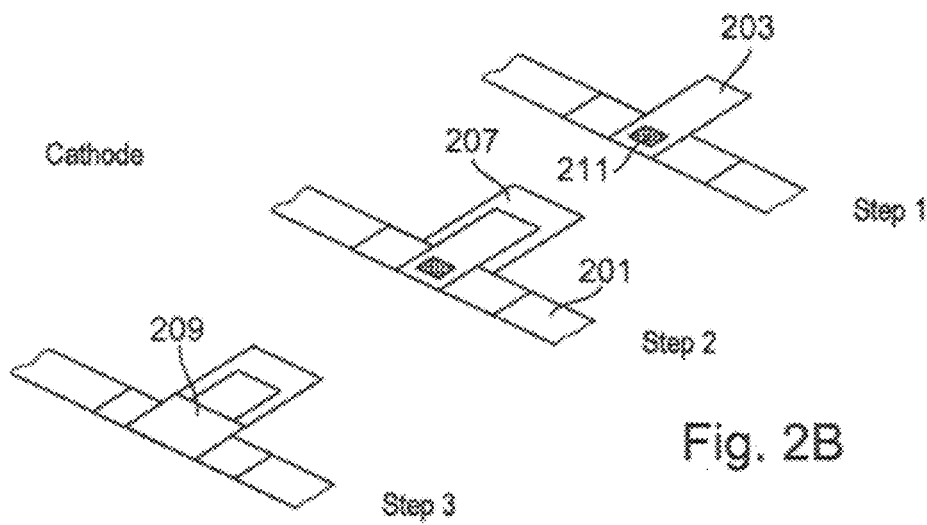
Figure 2C:
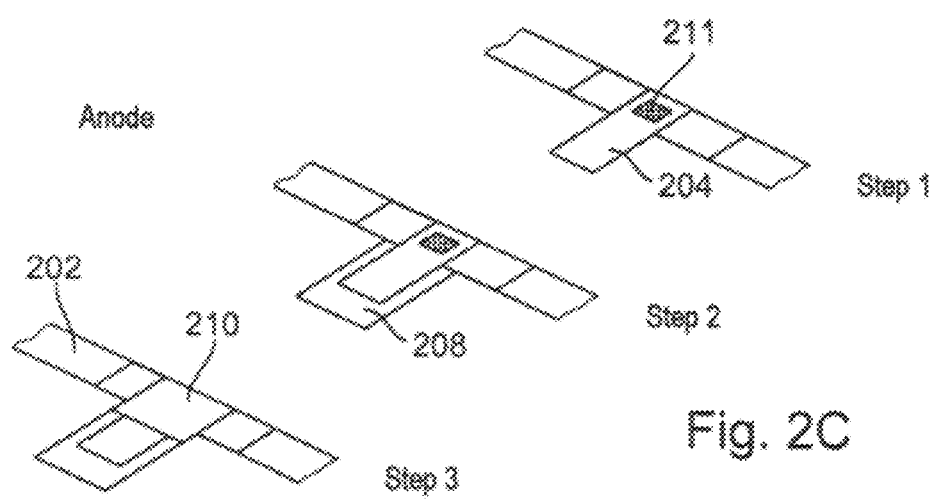

FIG. 2A to FIG. 2C represent some important steps in the production of an electrode winding, which is suitable in particular for button cells (for example, as represented in FIG. 1). Thus, FIG. 2A shows segmented collector foils 201 and 202 coated with active electrode material, to which conductor strips 203 and 204 offset at an angle of 90° are attached by welding. The conductor 204 on the anode side consists of nickel or copper, and the conductor 203 on the cathode side of aluminum. The conductors 203 and 204 are respectively applied in a material-free region (205, 206) of the collector foils 201 and 202. Elsewhere, they are coated with active material on both sides. The connection between the collector foils 201 and 202 and the conductors may, for example, be produced by welding in the region 211.

FIG. 2B and FIG. 2C represent the way in which the rear sides of the conductors 203 and 204 are adhesively bonded using an insulating tape 207 and 208 (for example, made of KAPTON or polypropylene) (Step 2). This insulating tape is subsequently intended to function as an insulating element, which is meant to prevent direct electrical contact between the conductors 203 and 204 and the end sides of the electrode winding which is to be produced. The conductors 203 and 204 are fixed on the front in a further step (Step 3) with further adhesive strips 209 and 210. The region 211 is bonded over in this case.

Figure 3A:
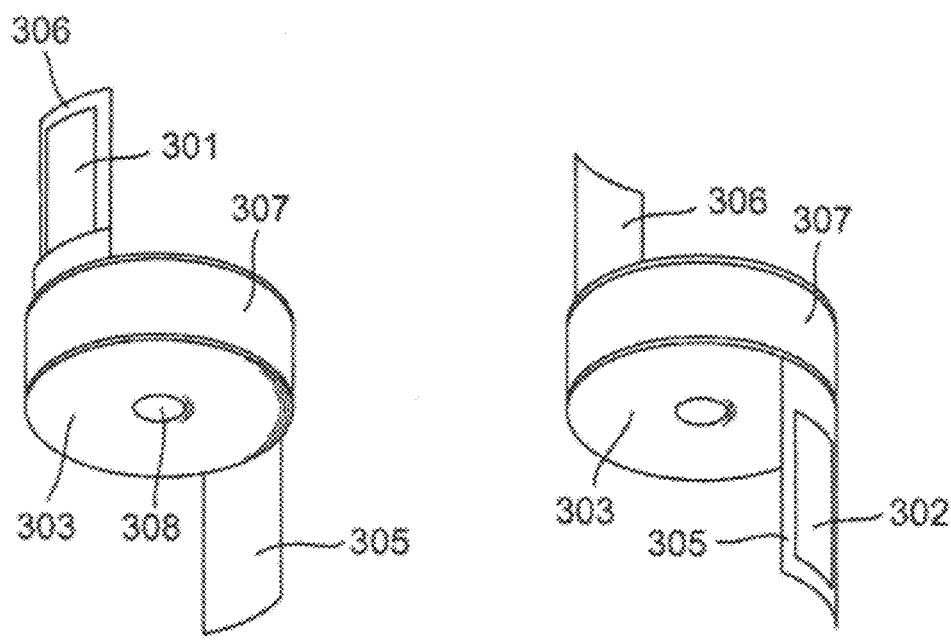
FIGS. 3A and 3B schematically show selected views of windings of the button cell.
Figure 3B:
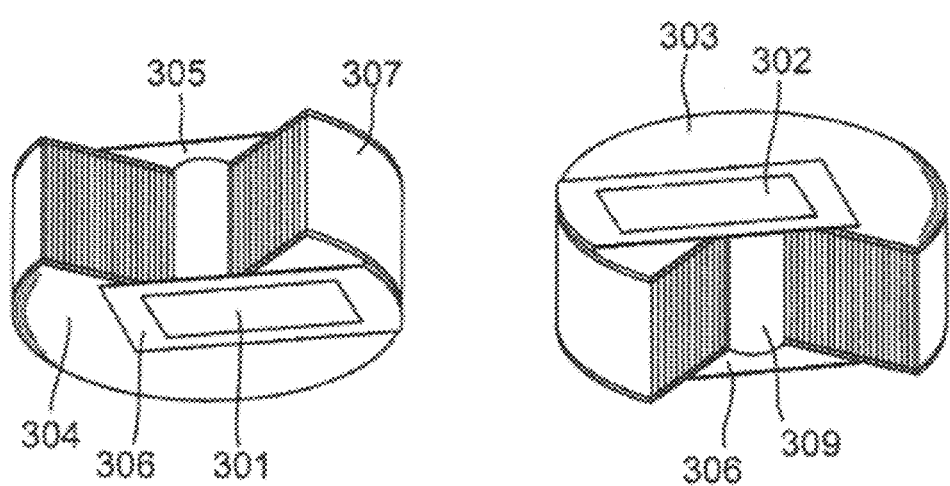

The conductor position in a winding of electrode foils obtained according to FIG. 2A to FIG. 2C can be seen clearly in FIG. 3A. Two different perspective representations of the same winding are shown (left and right). The conductor 301 (which corresponds to the conductor 204 in FIG. 2) and the conductor 302 (which corresponds to the conductor 203 in FIG. 2) are themselves aligned axially at a 90° angle to the winding direction and by folding down by 90° bear flat on the end sides 303 and 304 of the electrode winding. The insulating elements 305 and 306 (which correspond to the insulating tapes 207 and 208 in FIG. 2) prevent direct electrical contact between the conductors 301 and 302 and the end sides 303 and 304 of the electrode winding represented. The outer side of the winding is protected by the insulating film 307. Ideally, the conductors 301 and 302 overlap with the openings of the axial cavity 308 on the end sides, so that welding to the button cell housing can be carried out in this region. This can be seen clearly in FIG. 3B, as can the winding core 309 which fills the axial cavity 308.

Figure 4A:
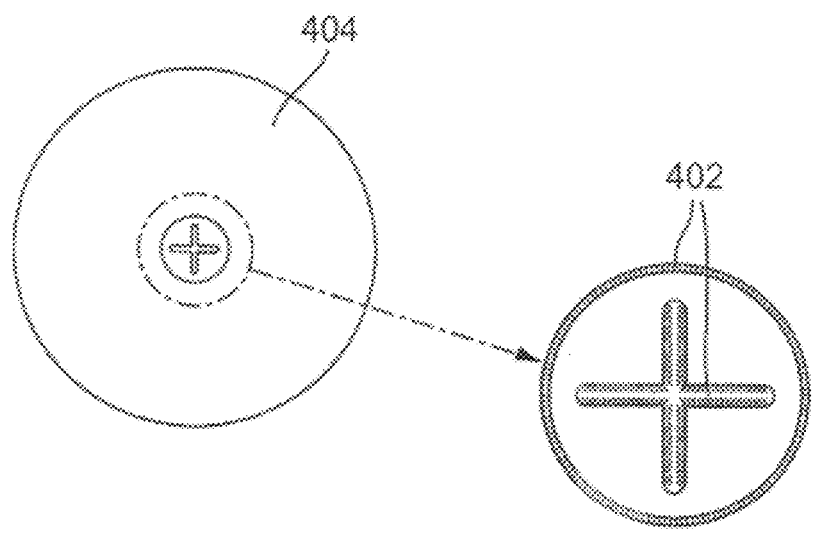
FIGS. 4A and 4B schematically show two different welds.
Figure 4B:
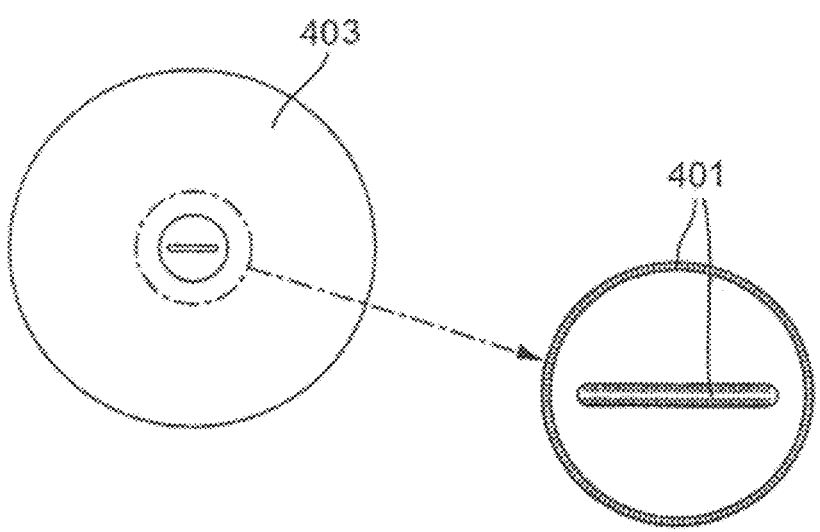

FIGS. 4A and 4B show possible welding variants. For example, it is possible to configure the weld bead as a minus sign 401 or a plus sign 402 (see the respective enlarged representations on the right) so as to indicate the polarity of the respective housing half at the same time. The plus sign 402 is preferably applied on the lower side 404 of a button cell, and the minus sign on the upper side 403.

Figure 5:
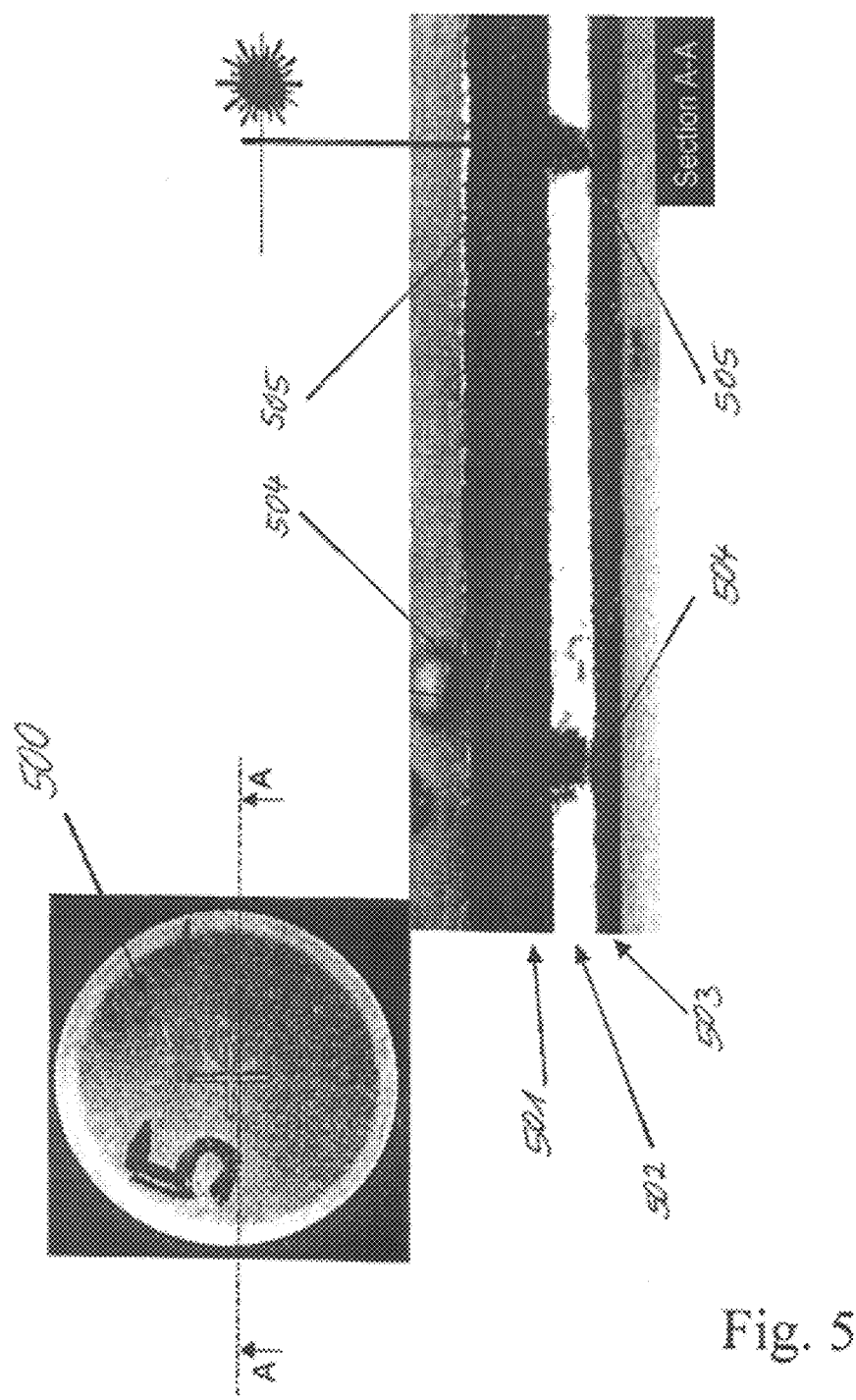
FIG. 5 shows microphotographs of a weld from top and cross-sectional views.

FIG. 5 shows an enlarged representation of a cross section through a housing half 500 of a button cell. The stainless steel cup wall 501, the aluminum conductor 502 bearing flat underneath and an insulating tape 503 of KAPTON film arranged below can be seen. The weld beads 504 and 505, which extend from the outer side of the housing inward as far as the insulating tape 503 of KAPTON film can be seen clearly. The top left image is a plan view of the cutaway plane bottom region of the housing half 500. The housing half 500 and the conductor 502 have been welded using an ytterbium-doped fiber laser of the YLR-400-AC type (manufacturing company IPG Photonics Corporation, USA). The intensity of the laser was in this case adjusted so that the insulating tape 503 was not penetrated.

The invention claimed is:

1. A button cell comprising:
    two metal housing halves separated from one another by an electrically insulating seal forming a housing having a plane bottom region and a plane top region parallel thereto;
    an electrode separator assembly comprising at least one positive electrode and at least one negative electrode inside the housing, the assembly provided in the form of a winding, lateral end sides of which face in a direction of the plane bottom region and the plane top region such that layers of the winding are oriented essentially orthogonally to the plane bottom region and plane top region; and
    metal conductors electrically connected to the at least one positive electrode and the at least one negative electrode, and respectively, to one of the housing halves,
    wherein the button cell has a height-to-diameter ratio less than one, at least one of the conductors is a metal foil and connects to the respective housing half with weld beads and/or weld spots passing through the housing, the weld beads and/or weld spots originate from an outer side, the metal foil connecting to the respective housing half bears flat on one of lateral end sides of the electrode separator assembly winding, and the metal foils are shielded from lateral end sides of the winding by insulating elements.

2. The button cell as claimed in claim 1, wherein the winding is a spiral-shaped winding.

3. The button cell as claimed in claim 1, wherein the weld beads and/or weld spots of the conductor or conductors are on an inner side of the housing in the plane bottom region or the plane top region, respectively.

4. The button cell as claimed in claim 1, wherein all of the conductors are metal foils.

5. The button cell as claimed in claim 1, wherein at least one subsection of the conductor or conductors bears flat on an inner side of the housing halves in the bottom and/or top region of the housing.

6. The button cell as claimed in claim 1, further comprising at least one separate insulator which prevents direct electrical contact between lateral end sides of the winding and the conductors.

7. The button cell as claimed in claim 1, wherein the conductor or conductors and the housing connect by one or more spot and/or linear welded connections.

8. The button cell as claimed in claim 1, wherein the winding comprises at its center an essentially cylindrical axial cavity delimited laterally by the winding and on lateral end sides by a subregion of the bottom or top region, respectively, and at least one of the conductors contains a weld with a corresponding housing half in the subregion.

9. A method for producing button cells according to claim 1 comprising:
   (a) providing a first and a second metal housing half;
   (b) placing an electrode separator assembly comprising a positive electrode and a negative electrode in one of the housing halves, wherein a metal conductor bonded to at least one of the electrodes;
   (c) assembling the two housing halves, and, subsequently
   (d) laser welding at least one of the conductors to the inner side of one of the metal housing halves.

* * * * *

(12) INTER PARTES REVIEW CERTIFICATE (2703rd)

United States Patent
Gaugler

(10) Number: US 9,799,858 K1
(45) Certificate Issued: May 3, 2022

(54) BUTTON CELL HAVING WINDING ELECTRODE AND METHOD FOR THE PRODUCTION THEREOF

(75) Inventor: Winfried Gaugler

(73) Assignee: VARTA MICROBATTERY GMBH

Trial Number:

IPR2020-01213 filed Jul. 7, 2020

Inter Partes Review Certificate for:

Patent No.: 9,799,858
Issued: Oct. 24, 2017
Appl. No.: 13/378,117
Filed: Dec. 14, 2011

The results of IPR2020-01213 are reflected in this inter partes review certificate under 35 U.S.C. 318(b).

INTER PARTES REVIEW CERTIFICATE
U.S. Patent 9,799,858 K1
Trial No. IPR2020-01213
Certificate Issued May 3, 2022

AS A RESULT OF THE INTER PARTES REVIEW PROCEEDING, IT HAS BEEN DETERMINED THAT:

Claims 1-8 are cancelled.

10. (substitute for claim 1) *A button cell comprising:*
two metal housing halves, each including a generally round end surface joined to a lateral surface region, the lateral surface regions of the housing halves at least partially overlapping each other and being separated from one another by an electrically insulating seal, the lateral surface regions providing a force-fit connection therebetween to form a leak-tight, button cell housing having a plane bottom region and a plane top region parallel thereto;
a rechargeable lithium-ion electrode separator assembly comprising at least one positive electrode, at least one negative electrode, and at least one separator and disposed inside the button cell housing, the assembly provided in the form of a spiral winding, lateral end sides of which face in a direction of the plane bottom region and the plane top region such that layers of the spiral winding are oriented essentially orthogonally to the plane bottom region and the plane top region; and
a first metal conductor electrically connected to the at least one positive electrode and a first of the housing halves and a second metal conductor electrically connected to the at least one negative electrode and a second of the housing halves,
wherein the button cell has a height-to-diameter ratio less than one,
wherein at least one of the first metal conductor and the second metal conductor is a metal foil and the metal foil connects to the first housing half or the second housing half with weld beads and/or weld spots passing through the button cell housing,
wherein the weld beads and/or weld spots originate from an outer side of the button cell housing,
wherein the metal foil bears flat on one of the lateral end sides of the spiral winding,
wherein the first metal conductor and the second metal conductor are respectively shielded from the lateral end sides of the spiral winding by a first insulating element and a second insulating element, and
wherein (i) the first housing half or the second housing half to which the metal foil connects, (ii) the metal foil, and (iii) one of the first insulating element or the second insulating element form a sequence of three flat layers in direct contact with one another in which the metal foil is interposed between the other two layers.

11. (substitute for claim 2) *The button cell as claimed in claim 10, wherein the one of the first insulating element or the second insulating element in the sequence of three flat layers comprises an adhesive film.*

12. (substitute for claim 3) *The button cell as claimed in claim 10, wherein each of the first metal conductor and the second metal conductor is a metal foil connected to a respective one of the first housing half and the second housing half with weld beads and/or weld spots passing through the button cell housing, and wherein the weld beads and/or weld spots of each of the first metal conductor and the second metal conductor are on an inner side of the button cell housing in the plane bottom region or the plane top region, respectively.*

13. (substitute for claim 4) *The button cell as claimed in claim 10, wherein all of the metal conductors are metal foils.*

14. (substitute for claim 5) *The button cell as claimed in claim 10, wherein at least one subsection of the first metal conductor and the second metal conductor bears flat on an inner side of a respective one of the housing halves in the plane bottom region and the plane top region of the button cell housing.*

16. (substitute for claim 7) *The button cell as claimed in claim 10, wherein each of the first metal conductor and the second metal conductor connects to the button cell housing by one or more spot and/or linear welded connections formed by laser welding.*

17. (substitute for claim 8) *The button cell as claimed in claim 10, wherein the spiral winding comprises at a center thereof an essentially cylindrical axial cavity delimited laterally by the winding and on lateral end sides by a subregion of the bottom or top region, respectively, and the metal foil connects to the first housing half or the second housing half with the weld beads and/or the weld spots passing through the button cell housing in the subregion.*

\* \* \* \* \*